Figure 1:
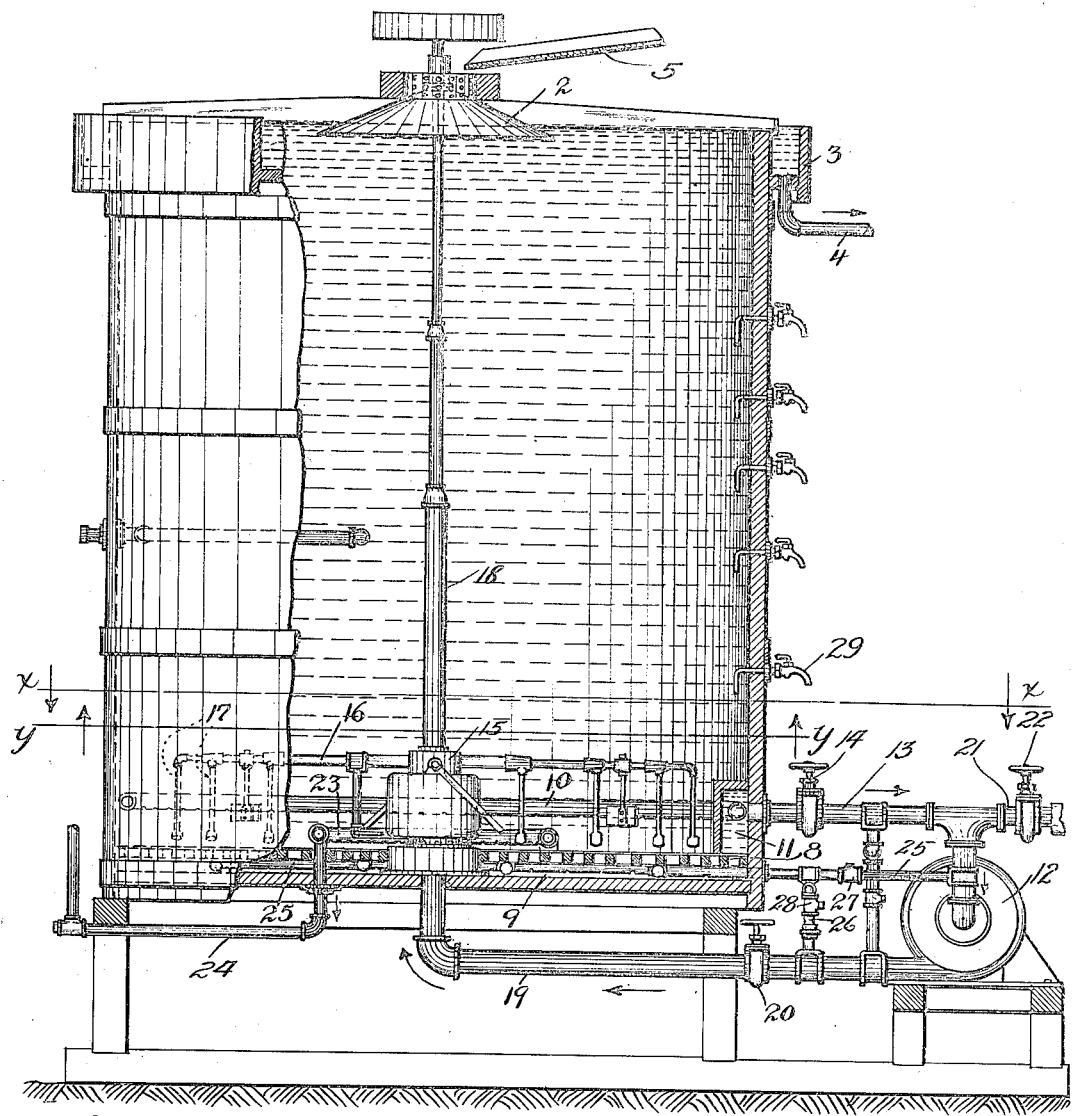

L. C. TRENT.
LEACHING APPARATUS.
APPLICATION FILED AUG. 24, 1914.

1,240,904.

Patented Sept. 25, 1917.
2 SHEETS—SHEET 1.

WITNESSES:

INVENTOR.
BY
ATTORNEYS.

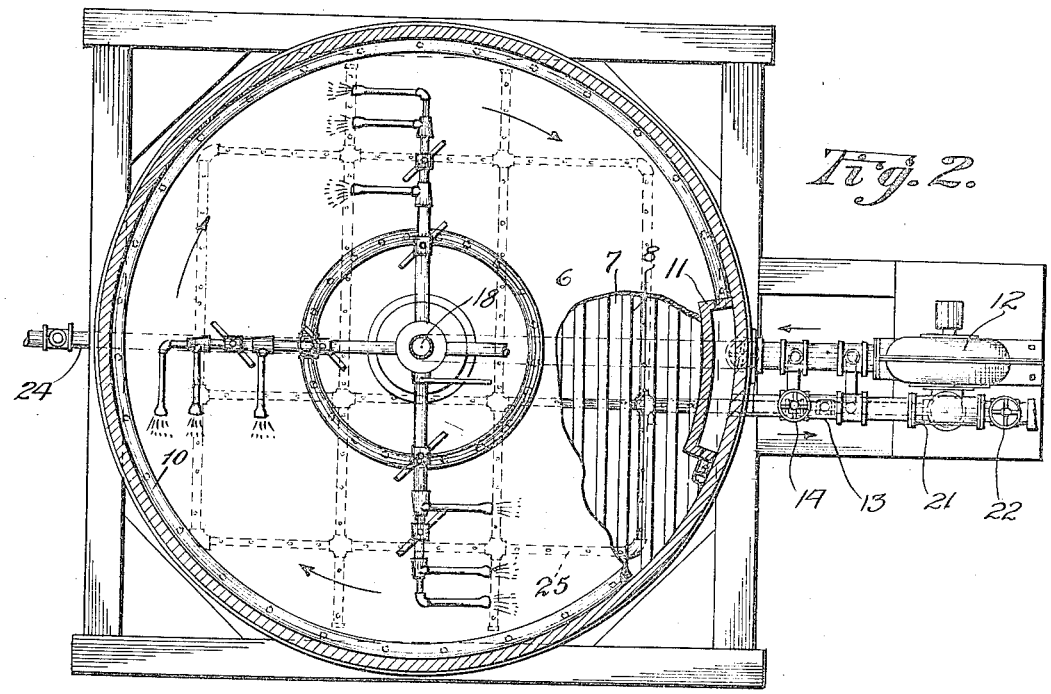
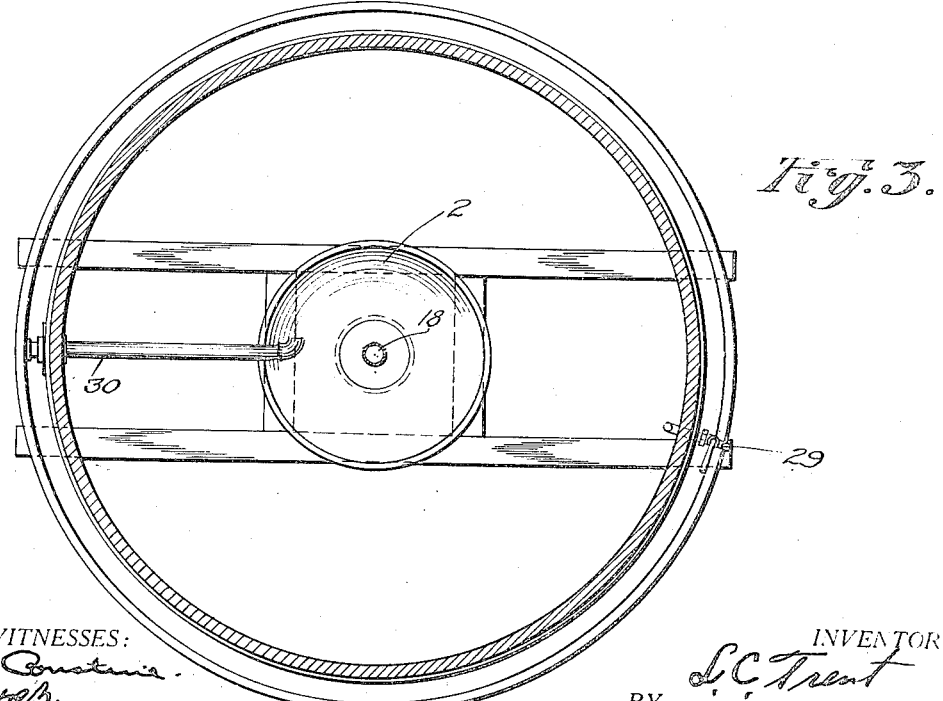

UNITED STATES PATENT OFFICE.

LAMARTINE C. TRENT, OF LOS ANGELES, CALIFORNIA.

LEACHING APPARATUS.

1,240,904.     Specification of Letters Patent.    Patented Sept. 25, 1917.

Application filed August 24, 1914. Serial No. 858,411.

*To all whom it may concern:*

Be it known that I, LAMARTINE C. TRENT, a citizen of the United States, residing at Los Angeles, in the county of Los Angeles and State of California, have invented certain new and useful Improvements in Leaching Apparatus, of which the following is a specification.

The present invention relates to an apparatus for separating metal values from cyanid slimes and other liquids carrying values to be extracted therefrom, the object of which is to thoroughly and quickly eliminate the base material and remove the free or clear liquid with its dissolved values at the earliest possible moment, replacing the withdrawn pregnant solution with fresh barren liquid for wash or replacement purposes, and to discharge the base or worthless material free of values.

To comprehend the invention reference should be had to the accompanying drawings, wherein—

Figure 1 is a vertical sectional view of the apparatus.

Fig. 2 is a cross sectional view, partly broken away, taken on the line x—x Fig. 1 of the drawings, looking downwardly in the direction of the arrow disclosing the arrangement of the filter bottom for the receiving vessel, and illustrating the suction pipe and its connection with the suction pump for withdrawing the partly thickened solution from within the receiving vessel and returning the same thereto through the agitating means.

Fig. 3 is a similar view taken on line y—y Fig. 1 of the drawing, looking upwardly in the direction of the arrow.

In the drawings, the numeral 1 is used to indicate any suitable shaped receiving vessel for the material to be treated, the dimension of which is dependent on the desired tonnage capacity of the apparatus; 2 a diffuser situated centrally within the said vessel adjacent the top thereof, and 3 an overflow launder circumferentially disposed outside of the receiving vessel at its upper edge. The overflow of clear pregnant liquid from the material under treatment is received into the launder 3 and escapes therefrom through the outlet pipe 4 for discharge to a suitable place of deposit, the material for treatment flowing from a pulverizer or its source of supply through the feed launder 5.

A slight distance from the bottom of the receiving vessel is placed a filter wall 6 composed of any suitable filtering material held separated or above the bottom 7 of the vessel 1 by means of the supporting frame 8, there being thus formed between the filter 6 and the bottom 7 a vacuum chamber 9.

Adjacent the bottom portion of the receiving vessel is located a perforated suction pipe 10, and in order that the material under treatment may be uniformly withdrawn from the vessel, the said suction pipe is preferably of circular form, and, preferably, the suction pipe connects with and discharges into a suction chamber 11, which communicates with a suction pump 12 outside of the receiving vessel by means of a pipe connection 13, the flow through which is regulated by a controlling valve 14.

Below the suction pipe 10 is placed a rotary agitator, which, in the present case, comprises a hollow rotatable head 15, from which project the tubular arms 16, each provided with a series of depending jet discharge nozzles 17. The rotary agitator is sustained by a central shaft 18, and the hollow head 15 thereof is connected to the suction pump 12 by means of the return pipe connection 19, provided with a controlling valve 20. Under this construction the material withdrawn from the vessel 1 into the pump 12 through the connection 13 is returned thereto through the rotary agitator by the connection 19, and the material within the receiving vessel adjacent the bottom thereof thus maintained in a condition of gentle agitation, causing the pregnant liquid with its dissolved values to gradually separate from the heavier or settling portions of the material under treatment.

Into the pump 12 is admitted from a suitable source of supply through the connection 21 barren liquid, the flow of the same into the pump being controlled and regulated by a valve 22 introduced therein. The barren liquid thus admitted into the pump intermingles with the thickened material flowing therein through the pipe connection 13 and is discharged therewith for return into the vessel 1 through the rotary agitator by means of the discharge connection 19. This fresh barren liquid washes the thickened material gradually settling toward the bottom of the receiving vessel, dissolves therefrom the metal values, and serves to replace the pregnant solution overflowing or withdrawn from the said vessel 1.

The heavier or base material with the values dissolved therefrom gradually settle as a cake on the surface of the filter wall 6, being withdrawn through the perforated suction pipe 23, which connects with the discharge pipe 24 connected to any suitable suction means. However, it is essential that these tailings or base material have, as far as possible, all liquid removed therefrom, and for this purpose, there is extended within the vacuum chamber 9 below the filter wall 6 a suction perforated pipe 25, which connects with the suction pump 12 and by a by-pass connection 26 with the discharge pipe 19. The vacuum created in the chamber 9 by the suction of the pump 12 on the valve 27 in the pipe 25 being opened, draws the liquid from the settled tailings into the said chamber, from which it is withdrawn through the suction pipe 25 into the said pump 12 for return to the receiving vessel through the pump discharge pipe 19. In case the surface of the filter wall 6 becomes clogged by the settled material thereon, the cake so formed may be broken down by forcing liquid into the receiving vessel through the filter wall, which is done by closing the valve 20 of the discharge pipe 19 and the valve 27 of the suction pipe 25 and opening the valve 28 of the by-pass connection 26, the valve 14 of pipe 13 being also closed. The barren liquid then admitted into the pump 12 is forced through the by-pass connection 26 and the suction pipe 25 into the vacuum chamber 9 and under pressure through the filter wall into the receiving vessel, thus freeing the filter wall by breaking down the cake formed thereon.

To test the condition of the material under treatment, the receiving vessel is provided with a series of tryout cocks 29, and in order that the clear liquid may be removed at a point below the overflow launder there is provided a hinged decanting tube 30.

The operation of the apparatus will be readily understood from the foregoing and the value thereof readily recognized by those conversant with the art of treating cyanid slimes, accomplishing, as it does, complete separation of the values from the base material and discharging the tailing or worthless material in a condition free of liquid to be recovered therefrom.

Having thus described the invention what is claimed as new and desired to be protected by Letters Patent is:—

1. A leaching apparatus comprising a receiving vessel, an agitator therein for gradually thickening and settling material under treatment, a filter bed situated adjacent the bottom of the receiving vessel to provide a vacuum chamber, a suction pump located outside of the receiving vessel, a suction pipe connected with said pump for the withdrawal of thickened material from within the vessel, connection between said pump and the vessel for the return therein of the withdrawn material, a suction pipe connection between the pump and the vacuum chamber below the filter bed, means for admitting to the pump a barren liquid, and a discharge outlet in the vessel for the withdrawal of the tailing therefrom.

2. A leaching apparatus comprising a receiving vessel for the material to be treated, an agitator within the vessel for the gradual thickening of the material fed therein, means for withdrawing material from the vessel and returning the same thereto under pressure, a filter bed situated adjacent the bottom of the vessel to provide a vacuum chamber, means for removing from the said chamber liquid drawn therein through the filter bed, and a discharge outlet in the receiving vessel for the withdrawal therefrom of the settled tailings.

3. In a leaching apparatus, the combination with a receiving vessel, of a filter bed situated adjacent the bottom thereof to provide a vacuum chamber within the vessel, a suction pump located outside the said vessel, connection between the pump and the vacuum chamber for withdrawing therefrom liquid admitted thereto through the filter bed, and connections between the pump and the vessel for the withdrawal of material from the vessel and the return thereof to the same for maintaining the material thereof in a condition of agitation.

4. In a leaching apparatus, the combination with a receiving vessel, of a filter bed situated adjacent the bottom thereof to provide a vacuum chamber within the vessel, a suction pump located outside the said vessel, connection between the pump and the vacuum chamber for withdrawing therefrom liquid admitted thereto through the filter bed, connections between the pump and the vessel for the withdrawal of material from the vessel and the return thereof to the same for maintaining the material thereof in a condition of agitation, and means for delivering into the pump for delivery into the said vessel a barren liquid.

5. A leaching apparatus comprising a receiving vessel, a filter bed located within the vessel near the bottom thereof providing a chamber between the same and the bottom of the vessel, a rotary agitator within the vessel above the filter bed, means for withdrawing material from the vessel and returning the same thereto under pressure, means for removing liquid from the chamber between the filter bed and the bottom of the receiving vessel, and a discharge outlet in the receiving vessel for the withdrawal therefrom of the settled tailings.

6. In a leaching apparatus, the combination with a receiving vessel provided adjacent its bottom with a vacuum chamber, of a filter bed cover for said chamber, suction means for drawing liquid into the vacuum chamber through the filter bed and removing the same therefrom, connections between said suction means for the withdrawal of material from the vessel and returning the same thereto for maintaining the material therein under circulation, and a discharge device for removing the settled tailings from the receiving vessel.

7. In a leaching apparatus, the combination with a receiving vessel, of means for delivering therein material to be treated, an overflow launder adjacent the upper edge of the vessel for the clear pregnant liquid, a filter bed situated adjacent the bottom of the vessel to provide a vacuum chamber, suction means connected with said chamber, a rotary agitator within the receiving vessel, and connections between the suction means and the vessel for withdrawing material therefrom and returning the same thereto under pressure through the rotary agitator.

8. A leaching apparatus, comprising a receiving vessel, a filter bed located within the vessel near the bottom thereof providing a chamber between the same and the bottom of the vessel, a rotary agitator within the vessel above and adjacent the filter bed, means for withdrawing material from the vessel and returning the same thereto under pressure, means for removing liquid from the chamber between the filter bed and the bottom of the receiving vessel, and a discharge outlet in the receiving vessel for the withdrawal therefrom of the settled tailings.

9. In a leaching apparatus, the combination with a receiving vessel for the material to be treated, of a filter bed within and extending across the vessel providing a chamber between the same and the bottom of the vessel, suction means for withdrawing into said chamber liquid through the filter bed and removing the same from the vacuum chamber, and a perforated suction pipe extending over and adjacent the upper face of the filter bed for removing from the vessel the settled tailings.

10. A leaching apparatus, comprising a receiving vessel, a filter bed located within the vessel near the bottom thereof providing a chamber between the same and the bottom of the vessel, a rotary agitator within the vessel arranged to work over and adjacent the filter bed, means for withdrawing material from the vessel at a point near the bottom thereof above the filter bed and returning the same to the vessel near the bottom thereof under pressure, means for withdrawing liquid from the chamber between the filter bed and the bottom of the vessel, and a discharge outlet in the vessel for the withdrawal of the tailings therefrom.

11. A leaching apparatus comprising a receiving vessel, a filter bed located within the vessel near the bottom thereof providing a chamber between the same and the bottom of the vessel, means for withdrawing material from the vessel at a point near the bottom thereof above the filter bed and returning the same to the vessel near the bottom thereof under pressure, means for withdrawing liquid from the chamber between the filter bed and the bottom of the vessel, and a discharge outlet in the vessel for the withdrawal of the tailings therefrom.

12. A leaching apparatus comprising a receiving vessel, a filter bed located within the vessel near the bottom thereof providing a chamber between the same and the bottom of the receiving vessel, a discharge outlet in the vessel for the withdrawal of the tailings therefrom, a pump located outside of the receiving vessel, connections with the pump and the vessel for withdrawing material therefrom and returning the same thereto, means for admitting to the pump a barren liquid, a connection between said pump and the chamber below the filter bed, and valves controlling said connections and said last mentioned means whereby liquid may be withdrawn from the chamber below the filter bed through said last mentioned connection by the pump, or barren liquid may be forced into said chamber and upwardly therefrom through the filter bed, substantially as described.

13. A leaching apparatus comprising a receiving vessel, a filter bed located within the vessel near the bottom thereof providing a chamber between the same and the bottom of the receiving vessel, a discharge outlet in the vessel for the withdrawal of the tailings therefrom, a pump located outside of the receiving vessel, connections with the pump and the vessel for withdrawing material therefrom and returning the same thereto, means for admitting to the pump a barren liquid, a connection between said pump and the chamber below the filter bed, and valves controlling said connections and said last mentioned means whereby barren liquid may be forced into the chamber below the filter bed and upwardly through the same.

14. A leaching apparatus comprising a receiving vessel, a filter bed located within the vessel near the bottom thereof providing a chamber between the same and the bottom of the receiving vessel, a rotary agitator within the vessel arranged to operate over and adjacent the filter bed, a discharge outlet in the vessel for the withdrawal of the tailings therefrom, a pump located outside of the receiving vessel, connections with the pump and the vessel for withdrawing material therefrom and returning the same thereto, means for admitting to the pump a barren liquid, a connection between said pump and the chamber below the filter bed, and valves controlling said connection and said last mentioned means whereby liquid may be forced into the chamber below the filter bed and upwardly through the same.

In testimony whereof I have signed my name to this specification in the presence of two subscribing witnesses.

LAMARTINE C. TRENT.

Witnesses:
 HARRY A. TOTTEN,
 D. B. RICHARDS.